United States Patent [19]
Murakami et al.

[11] Patent Number: 5,147,140
[45] Date of Patent: Sep. 15, 1992

[54] BALL-AND-ROLLER BEARING

[75] Inventors: Yasuo Murakami, Yamato; Shinichi Shirota, Ebina; Shigeru Okita, Yokohama, all of Japan

[73] Assignee: NSK Ltd., Tokyo, Japan

[21] Appl. No.: 799,437

[22] Filed: Nov. 26, 1991

[30] Foreign Application Priority Data

Nov. 30, 1990 [JP] Japan .................. 2-334146

[51] Int. Cl.$^5$ ............................................. F16C 33/62
[52] U.S. Cl. ................................. 384/492; 384/912
[58] Field of Search .............. 384/490, 491, 492, 569, 384/565, 625, 912

[56] References Cited

U.S. PATENT DOCUMENTS

| | | | |
|---|---|---|---|
| 4,555,186 | 11/1985 | Scruggs | 384/912 X |
| 4,659,241 | 4/1987 | Bamberger et al. | 384/492 X |
| 4,871,268 | 10/1989 | Furumura et al. | 384/492 |
| 4,930,909 | 6/1990 | Murakami | 384/492 |
| 5,011,304 | 4/1991 | Murakami et al. | 384/492 |

FOREIGN PATENT DOCUMENTS

| | | |
|---|---|---|
| 62-29487 | 6/1987 | Japan . |
| 62-132031 | 6/1987 | Japan . |
| 1460227 | 12/1976 | United Kingdom . |
| 2243417 | 10/1991 | United Kingdom . |

OTHER PUBLICATIONS

Special Steel Handbook, (First Edition Compiled by the Electric Steel Manufacturing Laboratories, Published by Rikougaku Sha on May 25, 1969) p. 21, ch. 10.
Technical Journal (No. 646 Compiled by Nippon Seiko Inc. and published in Sep., 1986) pp. 18-25.
Zaretsky, Erwin V., "Effect of Component Differential Hardnesses on Residual Stress and Rolling-Contact Fatigue", NASA TN D-2664, (1965), pp. 1-14.

*Primary Examiner*—Thomas R. Hannon
*Attorney, Agent, or Firm*—Shapiro and Shapiro

[57] ABSTRACT

A ball-and-roller bearing provided with a bearing ring and rolling element has the surface hardness of at least one of the bearing ring and rolling element of Hv 900 or more and the minimal compression residual stress of 100 kgf/mm$^2$ or more in the depth from the surface of the bearing ring and/or rolling element to the depth equivalent to a 2% of the mean diameter of the rolling element and at the same time, the bearing is closely sealed to prevent any foreign particles from being ingressed thereinto, thus making possible a significant improvement of its longevity.

4 Claims, 3 Drawing Sheets

BALL-AND-ROLLER BEARING

BACKGROUND OF THE INVENTION

1. Field of the Invention

The present invention relates to a ball-androller bearing. More particularly, the invention relates to a long-lived ball-and-roller bearings needed for an alternator, an intermediate pulley, and an electromagnetic clutch, which are used under clean lubricating condition in an electric motor, automobile or the like.

2. Related Background Art

Traditionally, to implement the longevity of the ball-and-roller bearing, there has been adapted a method to perform a high level cleaning of the bearing material and the use of case hardening steel.

Also, as disclosed in Japanese Patent LaidOpen Application No. 62-132031, there is a conventional example in which the carburizing hardening layers of a bearing ring and rolling element are formed deeper to prolong the bearing life.

Futhermore, as disclosed in Japanese Patent Publication No. 62-29487, there is a conventional example in which the bearing cracking tenacity is enhanced by giving an isothermal treatment such as a martempering to a bearing steel of SUJ 3 and the like, for example, so that the life of the bearing is prolonged.

There is also a conventional example in which attention is given to the compression residual stress which is effective to the anti-rolling fatigue of a ball-and-roller bearing to improve the longevity of the bearing. In this conventional example, the compression residual stress (Sr) works in the direction towards the reduction of the maximum static shearing stress ($\tau$ max), and the maximum shearing stress corrected by Sr ($\tau$ max) r (where $\tau$ max is an absolute value representation) is expressed as given below.

$$(\tau \text{ max}) r = \tau \text{ max} - \tfrac{1}{2}(Sr) \quad (1)$$

(Zaretsky. E. V, NASA TND - 2664; 1965) Here, the greater the compression-residual stress (Sr), the further is reduced the maximum shearing stress (($\tau$ max)r). Also, the rolling fatigue life (Life) is expressed as $$\text{Life} = K [1/(\tau \text{ max}) r]^9 \quad (2)$$

(where K is a proportional constant) so as to intend the improvement of the rolling fatigue life (Life) by adding the compression residual stress (Sr).

However, there has occurred a problem that with the conventional techniques of the high level cleaning used for the bearing steel and the carburization of the bearing material alone, the longevity of the bearings cannot be attained to meet the heavy-load and high-velocity requirements in using the bearings in recent years.

Also, in the conventional example in which attention is given to the compression residual stress, there has been a problem that even if the compression residual stress is increased, it is impossible to obtain in practice the rolling life expected by the rule to rise to the ninth power expressed in the aforesaid equation (2) and the longevity improvement factor is rather small.

Also, the conventional example disclosed in the Japanese Patent Laid-Open Application No. 62-132031 required a longer time for its heat treatment to form a deeper carburized layer while a specially arranged isothermal treatment is required to implement the conventional example disclosed in the Japanese Patent Publication No. 62-29487. As a result, both of them have a problem in that the heat treatment productivity is low and that a more sufficient life should be obtained in order to meet the desired heavy-load and highvelocity requirements.

SUMMARY OF THE INVENTION

The present invention is therefore designed to solve these problems and the object thereof is to provide a long-lived ball-and-roller bearing by optimizing the surface hardness without sacrificing the heat treatment productivity in addition to the closed sealing mechanism and the compression residual stress effective for the anti-rolling fatigue.

In order to achieve this object, the present invention is to provide a ball-and-roller bearing having a bearing race and a rolling element wherein the surface hardness of at least one of the aforesaid bearing race and rolling element is more than Hv 900 and the minimal compression residual stress is 100 kgf/mm$^2$ in the depth from the bearing race and/or a rolling surface to the depth up to substantially 2% of the average diameter of the aforesaid rolling element. Hence, it is possible to improve the longevity of the aforesaid ball-and-roller bearing.

Hereinafter, the critical meaning, function, and the like of each of the characteristic values in the present invention will be described.

The Surface Hardness of More Than Hv 900

On the bearing race and rolling surface, great surface pressures are locally given repeatedly, and in order to improve the strength against rolling fatigue as well as the anti-seizing ability of the bearing, it is effective to enhance the surface hardness. Until the hardness of Hv 900 the rolling fatigue is increasingly intensified as the hardness is increased. However, when the hardness exceeds Hv 900, then the rolling fatigue becomes constant without intensifying its rolling fatigue even if the hardness is further increased. Thus, the surface hardness of at least one of the bearing race and rolling element is defined to be more than Hv 900.

The Minimal Compression Residual Stress of 100 kgf/mm$^2$ Or More in the Depth from the Bearing Surface And/Or Rolling Surface to the Depth Equivalent to Substantially 2% of the Average Diameter of the Aforesaid Rolling Element When the bearing races are in contact with the rolling element while rolling, shearing stress is generated under the respective surfaces, leading to the main cause for the cracking to occur, which further results in flaking. Thus, the life of the ball-and-roller bearing is shortened. In order to reduce the aforesaid shearing stress, it is effective to give a compression residual stress to the ball-and-roller bearing and enhance its value.

The depth, where the value of the shearing stress generated by the contact of the bearing ring and rolling element becomes maximum, is less than a 2% of the average diameter of the rolling element from its surface. Therefore, it is effective for prolong the rolling fatigue life to reduce the shearing stress in this location. With this in view, the inventor hereof et al have examined intensively to find the value of the compression residual stress best suited for the improvement of the anti-rolling fatigue property to be given in the aforesaid location of the ball-and-roller bearing. As a result, it is discovered that for the effective application thereof, the minimal compression residual stress should be defined to be 100 kgf/mm$^2$ or more in the depth from the bearing race and/or the rolling surface to the depth equivalent to a 2% of the average diameter of the aforesaid rolling element.

In order to obtain the surface hardness and the compression residual stress for a ball-and-roller bearing according to the present invention simultaneously, it is effective to perform a known shot-peening, case hardening (carburizing, carbonitriding, and induction hardening), and the like, for example. By defining the treatment conditions of the shot-peening, case hardening and others appropriately, a desired surface hardness and compression residual stress can be obtained. Particularly, the shot-peening working is efficient as a method to obtain the desired surface hardness and compression residual stress.

However, the aforesaid shot-peening treatment is a kind of cold working, for example. Therefore, the hardness and compression residual stress are formed on the surface of a work piece due to the work hardening given by the plastic deformation. Accordingly, the surface texture of the aforesaid work piece is in a highly strained state. Then, if the bearing is used in a condition where foreign particles are ingressed in the rolling surface thereof, indentation may result thereon, and there is some case where cracking is generated in the circumference of such indentation depending on the amount of the strain, (hardness and size of such foreign substance or dust) on the rolling surface at the time of the indentation being formed. Therefore, it is desirable to prevent the ingression of any foreign particles into the bearing as much as possible when the ball-and-roller bearing having the surface hardness and compression residual stress according to the present invention is used.

Now, as means for preventing the ingression of the foreign particles into the bearing, it may be also effective to provide the ball-and-roller bearing with a closed sealing. With a bearing having a closed sealing grease for the prevention of the foreign substance ingression, the formation of the indentation due to foreign substance can be prevented even if, for example, the rolling surface thereof is in a highly strained state because of the shot-peening, thus making possible the improvement of the longevity of the bearing. In this way, the surface hardness and the value of the compression residual stress for the bearing according to the present invention are satisfied and at the same time, the ingression of any foreign particles can be prevented by the closed sealing, so that a ball-and-roller bearing of a further longevity can be provided.

Furthermore, the inventor hereof et al pay attention to an oxide nonmetallic inclusion which is the origin of the flaking and as a result of intensive study or experiment on the relationship between the life of the bearing and the aforesaid nonmetallic inclusion, it is found as disclosed in U.S. Pat. No. 5,011,304 that there has been no nonmetallic inclusion having its mean particle diameter of 13 μm or more and that a ball-and-roller bearing using the steel which has 80 or less nonmetallic inclusions having its mean particle diameter of 3 μm or more and less than 13 μm in a testing area of 165 mm$^2$ shows a significant improvement of its longevity. Then, the less the existing numbers of the nonmetallic inclusion of the mean particle diameter of 3 μm or more and less than 13 μm, the more the bearing life is prolonged. Also, if nonmetallic inclusion having its mean particle diameter of 13 μm or more exists, the flaking tends to occur and cause the bearing life to be shortened. This relationship between the existence of the nonmetallic inclusion and the bearing life is not related to the improvement of the longevity by the surface hardness and compression residual stress of the aforesaid bearing at all, and the aforesaid relationship is satisfied with respect to a bearing having any surface hardness and compress residual stress. The compression residual stress produces an effect to reduce the shearing force, and in addition, by reducing the existence of the nonmetallic inclusion, it is possible to reduce the cause itself to induce the stress concentration due to the shearing stress. As a result, the bearing life is further prolonged. In this way, it is possible to improve the life of the ball-and-roller bearing significantly if such a bearing satisfies completely the surface hardness and value of the compression residual stress of the bearing according to the present invention and the hardness, size and existence factor of the foreign particles, and further the existing numbers of the oxide nonmetallic inclusion as well.

In this respect, to make the existing numbers of the oxide nonmetallic inclusion of the mean granular diameter of 13 μm or more zero in the testing area of 165 mm$^2$, it is effective to use the vacuum double melting method which implements a VAR (Vacuum Arc Remelting) method after the treatment by a VIM (Vacuum Induction Melting) method.

BRIEF DESCRIPTION OF THE DRAWINGS

The above-mentioned object of the present invention, and the manner of achieving it will become more apparent and the invention itself will be better understood by reference to the following description of the embodiments of the invention, taken in conjunction with the accompanying drawings, wherein.

DESCRIPTION OF THE PREFERRED EMBODIMENTS

Now, on the basis of the drawings, the embodiments according to the present invention will be described.

Embodiment 1

Using SUJ 2 and SCr 420, the heat treatments and shot-peening working shown in Table I are performed to manufacture disc type testing pieces (Test piece Nos. 1-14) shown in Table I.

TABLE I

| | Test piece No. | Steel used | Heat treatment | Shot peening | Surface hardness (Hv) | *Minimal residual stress in the depth to a 1% of the mean diameter of the rolling element from the surface (kgf/mm²) | Nonmetallic inclusion Numbers of grains mean diameter of 3 μm or more | Nonmetallic inclusion Presence of grains mean diameter of 13 μm or more |
|---|---|---|---|---|---|---|---|---|
| Comparative products | 1 | SUJ2 | Hardening | No | 752 | +10 | 122 | Yes |
| | 2 | ↑ | ↑ | Yes | 812 | −60 | ↑ | ↑ |
| | 3 | ↑ | ↑ | ↑ | 920 | −50 | ↑ | ↑ |
| | 4 | ↑ | ↑ | ↑ | 865 | −110 | ↑ | ↑ |
| | 5 | SCr420 | Cemented hardening | No | 746 | −20 | 190 | ↑ |
| | 6 | ↑ | ↑ | Yes | 800 | −70 | ↑ | ↑ |
| | 7 | ↑ | ↑ | ↑ | 920 | −70 | ↑ | ↑ |
| | 8 | ↑ | ↑ | ↑ | 850 | −110 | ↑ | ↑ |
| Invented products | 9 | SUJ2 | Hardening | Yes | 950 | −120 | 122 | Yes |
| | 10 | ↑ | ↑ | ↑ | 910 | −110 | ↑ | ↑ |
| | 11 | ↑ | ↑ | ↑ | 910 | −110 | 58 | No |
| | 12 | Scr420 | Cemented hardening | ↑ | 900 | −100 | 190 | Yes |
| | 13 | ↑ | ↑ | ↑ | 910 | −120 | ↑ | ↑ |
| | 14 | ↑ | ↑ | ↑ | 930 | −100 | 76 | No |

*Minimal residual stress
+Tension
−Compression

In this respect, the minimal compression residual stress is measured by an X ray residual stress measurement in the depth from the test piece surface to the depth equivalent to a 1% of the average diameter of the rolling element used in the embodiment 2 which will be described later. The measurement of the nonmetallic inclusion is represented in a value per testing area of 165 mm².

In this respect, the heat treatments and shotpeening working shown in Table I are performed as follows:

Hardening

After heating at 800–850 for 30 minutes, oil quenching is given. Then, annealing is performed at 150–200° C. for two hours.

Carburizing and hardening

In an atmosphere of Rx gas + enriched gas, carburizing and hardening is given at 930±5° C. for approximately eight hours. Subsequently, after oil quenching, annealing is performed at 180° C. for two hours.

Shot-peening working

Figure 3:
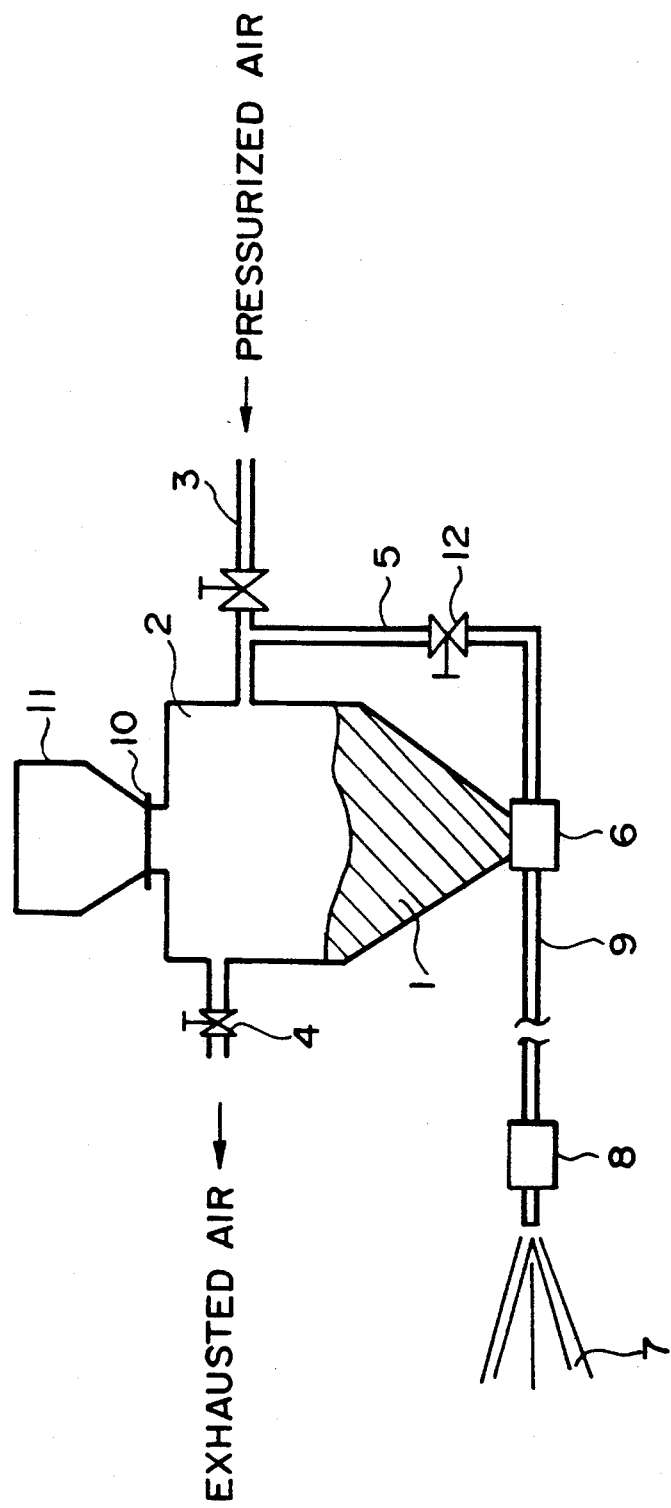
FIG. 3 is a view schematically showing the structure of a shot-peening working apparatus.

The direct pressure nozzle type shot-peening apparatus shown in FIG. 3 is employed.

This apparatus comprises a pressure tank 2 in which shot grains 1 are filled, a pressurized air supply tube 3 for supplying pressurized air to the pressure tank 2, an exhaust tube 4 for exhausting the air supplied to the pressure tank 2, a mixer 6 provided below the pressure tank 2 for mixing compressed air from a branch tube 5 of the pressurized air supply tube 3 and the shot grains 1, a hose 9 for discharging shot 7 from a nozzle 8 at the leading end thereof onto the surface of a work piece, a hopper 11 for supplying shot grains 1 into the pressure tank 2 through a shutter 10, and an adjustable valve 12 provided on the way for the branch tube 5 for adjusting the air pressure to control the velocity with which to discharge the shot grains.

In the present embodiment, steel balls of the mean granular diameter of 0.72 mm and mean hardness of HRC 61 are used as the shot grains 1. The shot peening working is performed so that the shot discharging velocity is 32–120 m/sec. (mean discharging velocity being 80 m/sec.). For the shot peening working, no long time heat treatment, and others are needed to give surface hardness and compression residual stress to the work piece. Consequently, the heat treatment productivity is not lowered. Here, in performing the shot peening working, the values of the minimal residual stress formed on the surfaces of the test pieces are obtained as shown in Table I by adjusting the opening of the valve 12. In this respect, the tensioning force of the aforesaid minimal residual stress is represented by a mark (+) while the compression strength thereof, by a mark (−).

Subsequently, thrust life tests are conducted on each of these test pieces. This life test is conducted using a thrust type bearing steel testing machine shown in [Special Steel Handbook (First Edition Compiled by the Electric Steel Manufacturing Laboratories, Published by Rikougaku Sha on May 25, 1969) p. 21, ch. 10] in conditions that N=1,000 rpm, Pmax=578 kgf/mm², Lubricating oil; TM 68 turbine oil and clean lubrication.

Figure 1:
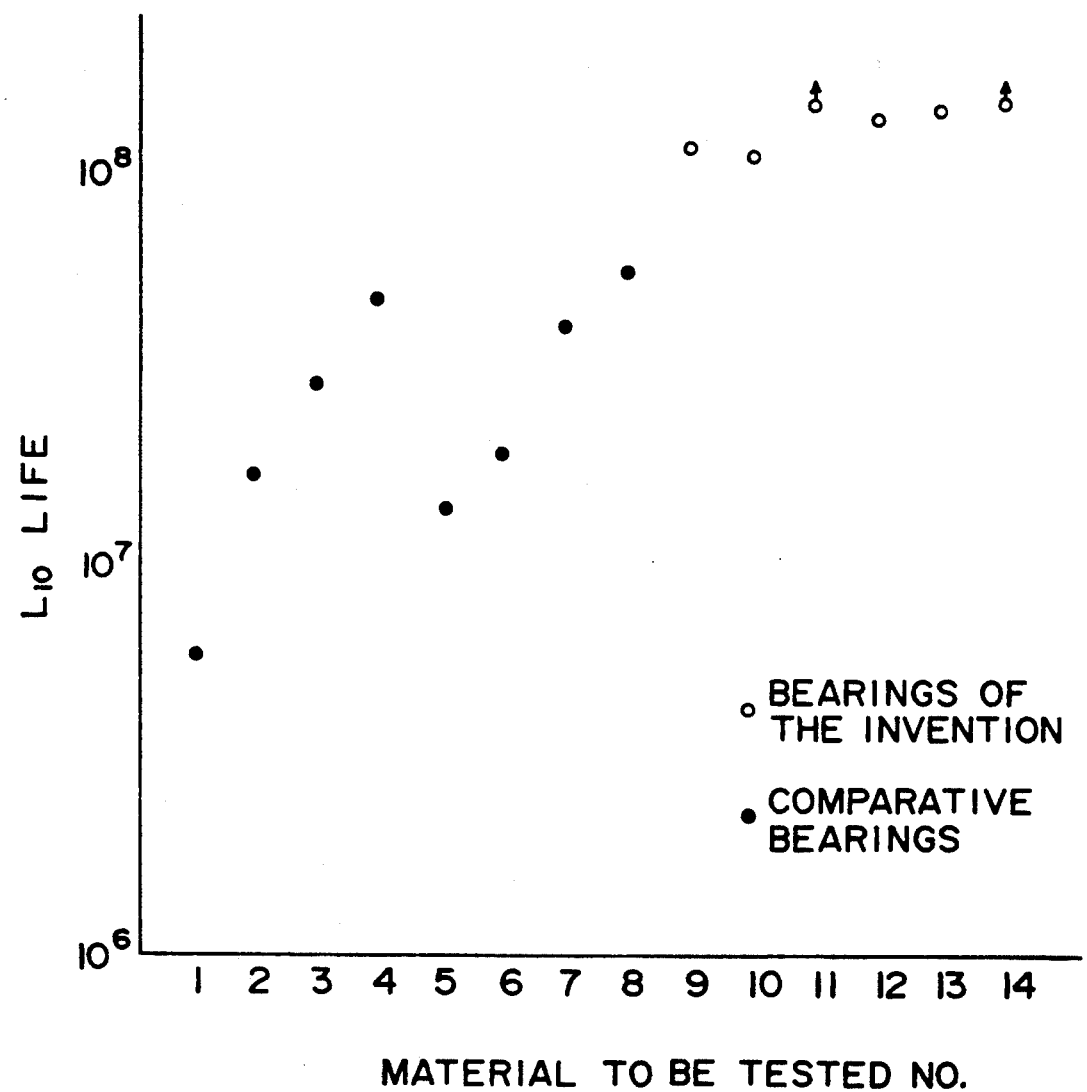
FIG. 1 is a graph illustrating the relationship between each of the testing pieces and the life at $L_{10}$ in the thrust life test for a first embodiment according to the present invention.

In this respect, on the judgment of the life, it is decided that the life is terminated when the flaking is generated on the test piece, and this life is represented by the number of the accumulated revolutions until the flaking has been generated for a 10% of the total number of each test piece ($L_{10}$, 90% remaining life). The results are shown in FIG. 1.

By the results shown in FIG. 1 it has been verified that the test pieces (test pieces Nos. 9–14; invented products) having the surface hardness of Hv 900 or more and the minimal compression residual stress of 100 kgf/mm² or more in the depth to a 1% of the mean diameter of the rolling element used for the embodiment 2 which will be described later from the test piece surface have significantly improved longevities at $L_{10}$ as compared with the other test pieces (test piece Nos. 1–8; comparative products). Also, it has been verified that the test pieces in which no oxide nonmetallic inclusion ($Al_2O_3$) of the mean granular diameter of 13 μm or more exists while having 80 or less oxide nonmetallic inclusion of 3 μm or more but less than 13 μm per test area of 165 mm² have further improved longevities at $L_{10}$ (test piece Nos. 11 and 14). Then, it has also been verified that the less the existing number of the aforesaid nonmetallic inclusion in the test piece, the longer is the life thereof at $L_{10}$. As a result, it will be clear that the test piece, which satisfies the conditions that its surface hardness is Hv 900 or more, its minimal compression residual stress is 100 kgf/mm² in the depth from its surface to the depth equivalent to a 1% of the mean diameter of the rolling element used for the embodiment 2, which will be described later, and also satisfies an additional condition that the total number of the nonmetallic inclusion of the mean granular diameter of 3 μm or more but less than 13 μm per test area of 165 mm² is 80 or less, has a further improvement of its longevity.

Embodiment 2

Using SUJ 2 and SCr 420, the heat treatments and shot-peening working shown in Table II to manufacture the bearing inner races (inner race Nos. 1-8) shown in Table II.

Here, the conditions of each heat treatment and shot-peening working, the measurement of the residual stress, and the measurement of the nonmetallic inclusion are the same as in the aforesaid embodiment 1.

Figure 2:
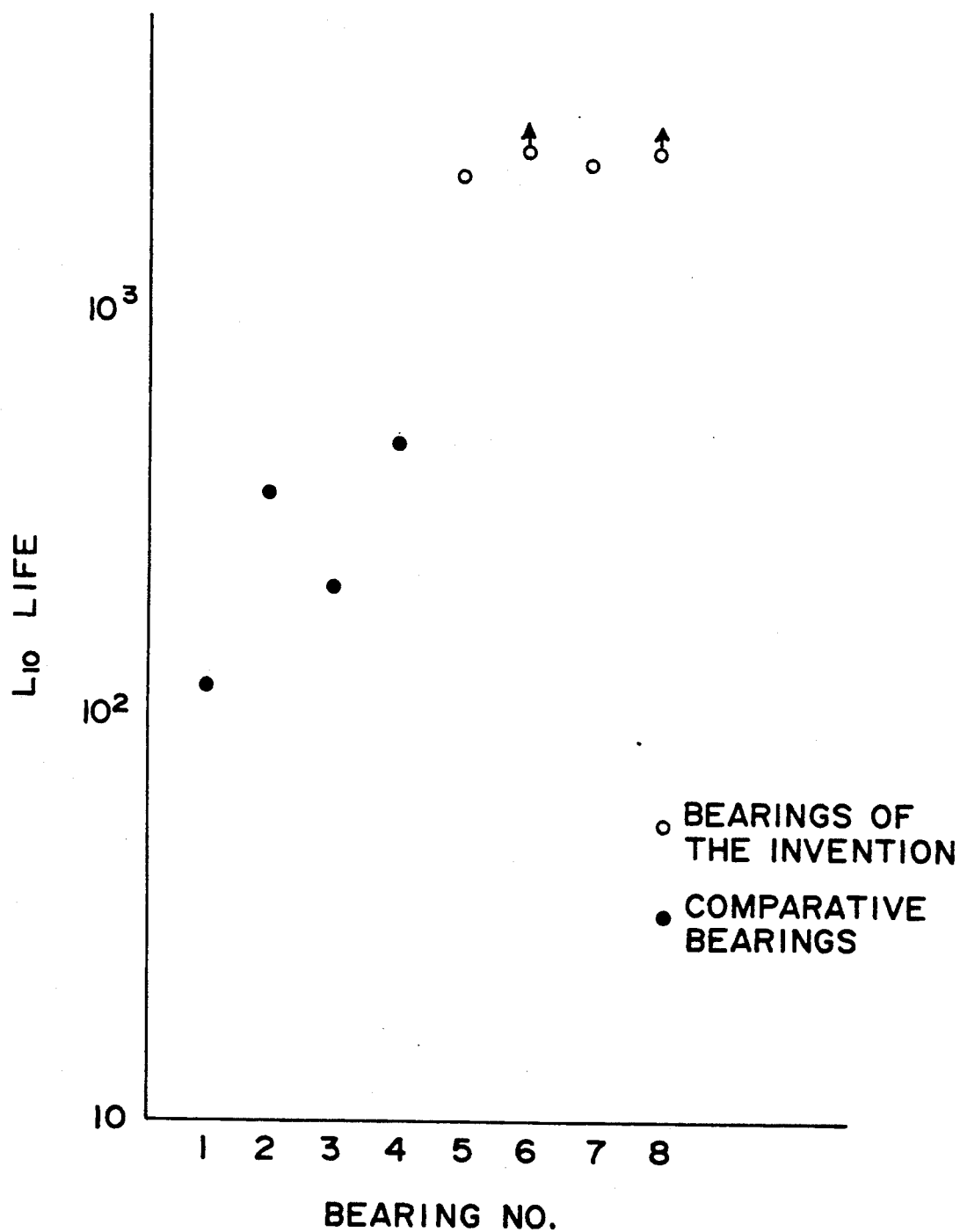
FIG. 2 is a graph illustrating the relationship between each of the testing pieces and the life at $L_{10}$ in the life test for a second embodiment according the present invention.

By the results shown in FIG. 2 it has been verified that the grease closing type ball-and-roller bearings (bearing Nos. 5-8; invented products) having at least the surface hardness of the inner race of Hv 900 or more and the minimal compression residual stress of 100 kgf/mm² or more in the depth to a 1% of the mean diameter of the rolling element from the surface of the inner race significantly improved longevities at $L_{10}$ as compared with the other bearings (bearing Nos. 1-4; comparative products). Also, it has been verified that the bearings in which no oxide nonmetallic inclusion ($Al_2O_3$) of the mean granular diameter of 13 μm or more exists while having 80 or less oxide nonmetallic inclusion of 3 μm or more but less than 13 μm per test area of 165 mm² have further improved longevities at $L_{10}$ (bearing Nos. 6 and 7). Then, it has also been verified that the less the existing number of the aforesaid nonmetallic inclusion in the bearing, the longer is the life thereof at $L_{10}$. As a result, it will be clear that the ball-and-roller bearing made of steel, which satisfies the

TABLE II

| | Test piece No. | Steel used | Heat treatment | Shot peening | Surface hardness (Hv) | *Minimal residual stress in the depth to a 1% of the mean diameter of the rolling element from the surface (kgf/mm²) | Nonmetallic inclusion Numbers of grains mean diameter of 3 μm or more | Nonmetallic inclusion Presence of grains mean diameter of 13 μm or more |
|---|---|---|---|---|---|---|---|---|
| Comparative products | 1 | SUJ2 | Hardening | No | 752 | +10 | 122 | Yes |
| | 2 | ↑ | ↑ | Yes | 920 | −50 | ↑ | ↑ |
| | 3 | SCr420 | Cemented hardening | No | 746 | −20 | 190 | ↑ |
| Invented products | 4 | ↑ | ↑ | Yes | 850 | −110 | ↑ | ↑ |
| | 5 | SUJ2 | Hardening | ↑ | 910 | −110 | 122 | ↑ |
| | 6 | ↑ | ↑ | ↑ | 910 | −110 | 58 | No |
| | 7 | SCr420 | Cemented hardening | ↑ | 900 | −100 | 190 | ↑ |
| | 8 | ↑ | ↑ | ↑ | 930 | −100 | 76 | No |

*Minimal residual stress
+Tension
−Compression

Subsequently, the grease closing type ball-androller bearings (JIS 6206 contact sealing type) are manufactured (bearing Nos. 1-8) by combining the inner races shown in Table II and the outer races and rolling element using the same steel as the inner race with the same heat treatments but not shot-peening working. In this respect, for the aforesaid grease closing, Albania grease No. 2 is used, and at this time, the aforesaid grease is packed in an amount equivalent to a 30% of the inner space of the bearing, for example. Also, the bearing numbers correspond to the numbers of the inner races used.

Using the grease closing type ball-and-roller bearings thus prepared, the life test is conducted. For this life test, a bearing durability life testing machine disclosed in [Technical Journal (No. 646 Compiled by Nippon Seiko Inc. and Published in September, 1986) p. 20] is used in conditions that radial gravity Fr =1,440 kgf, maximum bearing pressure $P_{MAX}$=350 kgf/mm², and revolution (inner race)=3,000 r.p.m. with the outer race at rest.

Here, the judgment on the life is made in the same way as the aforesaid embodiment 1. The results are shown in FIG. 2.

conditions that its surface hardness is Hv 900 or more, its minimal compression residual stress is 100 kgf/mm² in the depth from the surface of the inner ring to the depth equivalent to a 1% of the mean diameter of the rolling element and also satisfies an additional condition that the total number of the nonmetallic inclusion of the mean granular diameter of 3 μm or more but less than 13 μm per test area of 165 mm² is 80 or less, has a further improvement of its longevity.

Embodiment 3

Using SCr 420, the heat treatments and shotpeening working shown in Table III are performed to manufacture the bearing inner races (inner race Nos. 9-11) shown in Table III. In this respect, the inner race No. 10 represents the minimal compression residual stress in the depth from the surface of the inner race to the position corresponding to a 1% of the mean diameter of the rolling element while the inner race No. 11 represents the minimal compression residual stress at the position corresponding to the depth from the surface of the inner race to a 2% of the mean diameter of the rolling element.

TABLE III

| | Test piece No. | Steel used | Heat treatment | Shot peening | Surface hardness (Hv) | *Minimal residual stress in the depth to a 1% of the mean diameter of the rolling element from the surface (kgf/mm²) | Nonmetallic inclusion | |
|---|---|---|---|---|---|---|---|---|
| | | | | | | | Numbers of grains mean diameter of 3 μm or more | Presence of grains mean diameter of 13 μm or more |
| Comparative products | 9 | SCr420 | Cemented hardening | No | 750 | −20 | 76 | No |
| Invented products | 10 | ↑ | ↑ | Yes | 930 | −120 | ↑ | ↑ |
| | 11 | ↑ | ↑ | ↑ | 920 | **−105 | ↑ | ↑ |

*Minimal residual stress
+Tension
−Compression
**Indicates the minimal residual stress in the depth to the position corresponding to a 2% of the mean diameter of the rolling element from the surface of the inner ring Here, the conditions of each heat treatment and shot-peening working, the measurement of the residual stress and the measurement of the nonmetallic inclusion are the same as the aforesaid embodiment 1.

Subsequently, the grease closing type ball-and-roller bearings (JIS 6302 contact sealing type. DDU type bearings manufactured by Nippon Seiko Inc., for example) are manufactured (bearing Nos. 9–11) by combining the inner races shown in Table III and the outer races and rolling element using the same steel as the inner race with the same heat treatments but not shot-peening working. In this respect, for the aforesaid grease closing, Albania grease No. 2 is used, and at this time, the aforesaid grease is packed in an amount equivalent to a 30% of the inner space of the bearing, for example. Also, the bearing numbers correspond to the numbers of the inner races used.

Using the grease closing type ball-and-roller bearings thus prepared, the life test is conducted as in the embodiment 2. Here, the aforesaid test is conducted in conditions that radial gravity Fr =400 kgf, maximum bearing pressure $P_{MAX}$=320 kgf/mm², and revolution (inner ring)=6,000 r.p.m. with the outer race at rest.

Here, the judgment on the life is made in the same way as the aforesaid embodiment 1. The results are shown in Table IV.

TABLE IV

| Bearing No. | Life at $L_{10}$ (Time) |
|---|---|
| 9 | 322 |
| 10 | 2,013 |
| 11 | 2,500 or more |

From this result, it has been verified that the invented product (bearing No. 10) has the life at $L_{10}$ is long as much as six times as compared with the comparative product (bearing No. 9).

Also, the invented product (bearing No. 11), which has the minimal compression residual stress of 100 kgf/mm² in the depth from the surface of the inner race to the position corresponding to a 2% of the mean diameter of the inner race, shows in particular a significantly improved life at $L_{10}$ and it has been verified that the life becomes long as much as approximately eight times as compared with the comparative product (bearing No. 9). From this it has been verified that the grease closing type ball-and-roller bearing, which has the surface hardness of at least one of the bearing race and rolling element of Hv 900 or more as well as the compression residual stress of 100 kgf/mm² or more in the depth at least from the surface of the inner race to the depth equivalent to a 1% of the mean diameter of the rolling element or more preferably, the minimal compression residual stress of 100 kgf/mm² or more in the depth from the surface of the inner race to the depth equivalent to a 2% of the mean diameter of the rolling element, demonstrates a significantly improved life at $L_{10}$.

In the present embodiment, while the SUJ 2 and SCr 420 are used as the required steel, it is not limited thereto, and various kinds of high carbon chrome bearing steel such as SUJ 3, various kinds of carburized steel for the use of bearings such as SCM420H and SNCM, various kinds of high-speed steel and the like for the use of high temperature bearings such M50, and others may be used.

Also, in the present embodiment, while the shot-peening working on the steel surface is performed to obtain the surface hardness of the bearing and the compression residual stress simultaneously, it may be possible to provide the required surface hardness and compression residual stress by the use of the known case hardening (carburizing and hardening, carbonitriding, and induction hardening) only as the other means to serve the purpose.

Also, while it is preferable to use a clearer lubricating oil for the implementation of the present invention, the application thereof is still possible with a lublication having foreign particles mixed to make the life of the bearings long lived.

According to the present invention as set forth above, it is possible to improve further the anti-rolling fatigue capability by providing at least one of the bearing ring and rolling element with the surface hardness of Hv 900 or more while defining the minimal compression residual stress in the depth from the aforesaid bearing ring and/or rolling element to the depth equivalent to a 2% of the mean diameter of the aforesaid rolling element to be 100 kgf/mm² or more as well as the closed sealing to prevent any foreign particles from being ingressed into the bearing. As a result, a long-lived ball-and-roller bearing can be provided.

What is claimed is:

1. A ball-and-roller bearing provided with a bearing ring and rolling element, having:
   the surface hardness of at least one of said bearing ring and rolling element of Hv 900 or more; and
   the minimal compression residual stress of 100 kgf/mm² or more in the depth from the surface of the bearing ring and/or rolling element to the depth up to substantially 2% of the mean diameter of the rolling element.

2. A ball-and-roller bearing according to claim 1, wherein oxide nonmetallic inclusion per test area of 165 mm² shows its number zero for the mean granular diameter of 13 μm or more and 80 or less for the mean granular diameter of 3 μm or more but less than 13 μm.

3. A ball-and-roller bearing according to claim 2, wherein said bearing is lubricated with grease and closely sealed.

4. A ball-and-roller bearing according to claim 1, wherein said bearing is lubricated with grease and closely sealed.

* * * * *